March 28, 1950 — G. FRANK — 2,502,139
GASEOUS FUEL MIXER
Filed Oct. 31, 1947

Gustav Frank INVENTOR.

BY Victor J. Evans & Co.
ATTORNEYS

Patented Mar. 28, 1950

2,502,139

UNITED STATES PATENT OFFICE 2,502,139

GASEOUS FUEL MIXER

Gustav Frank, Fort Worth, Tex.

Application October 31, 1947, Serial No. 783,257

1 Claim. (Cl. 48—180)

My invention relates to internal combustion engines, and has among its objects and advantages the provision of an improved fuel vaporizer and mixer operating to provide a more perfect and uniform vaporization and mixture to the end that increased power may be had for a given amount of fuel and in which carbonization in the engine cylinders is greatly reduced.

Figure 1:
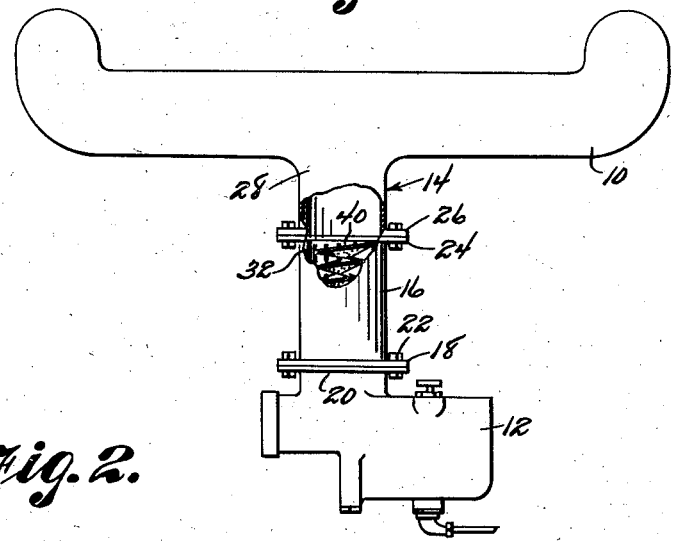
Figure 1 is a diagrammatic view of a conventional carburetor and intake manifold illustrating my invention associated therewith.

In the embodiment selected for illustration, I make use of the usual intake manifold 10 and a conventional carburetor 12 connected therewith through the medium of a cylindrical casing providing a fuel conduit 14. Interposed in the conduit 14 is a tubular section or inner casing 16 having a flange 18 to which the carburetor flange 20 is attached by bolts 22. The second flange 24 of the tubular section 16 is bolted to the flange 26 of the tubular section 28 attached to the intake manifold.

Figure 2:
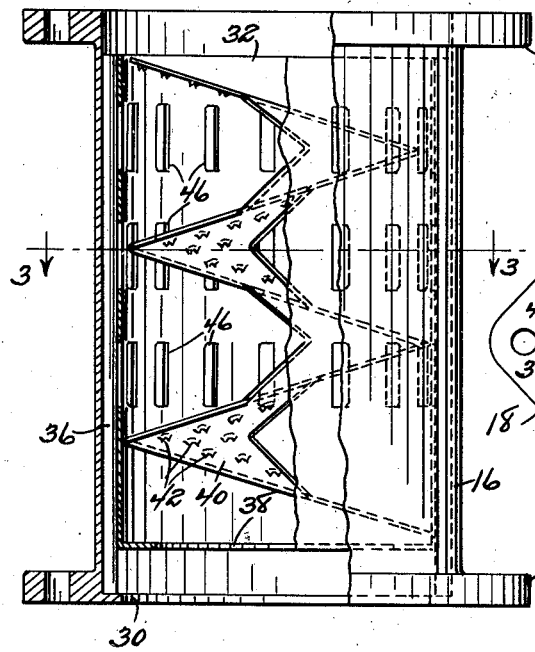
Figure 2 is a sectional view of the vaporizer and fuel mixer.
Figure 3:
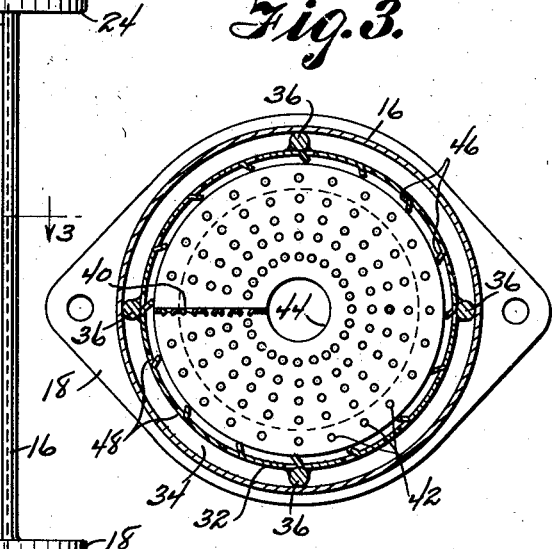
Figure 3 is a sectional view taken along the line 3—3 of Figure 2.

In Figures 2 and 3, the tubular section 16 is provided with a narrow internal annular flange 30 which constitutes a support for a tube 32 arranged concentrically inside the tubular section 16 and having an outside diameter somewhat less than the inside diameter of the tubular member to provide an annular space 34 between the tube and the tubular member.

The tube 32 comprises thin sheet metal and is provided with four rods 36 welded to its exterior face and arranged to rest on the flange 30. The rods are arranged in parallelism with the axis of the tube 32 and are preferably equally spaced circumferentially of the tube. An annular and inwardly extending flange 38 is formed at the lower end of the tube 32, which flange is of smaller diameter than the flange 30 but arranged concentrically therewith. Inside the tube 32 is secured a spiral sheet metal baffle 40 perforated throughout its entire length to provide downwardly projecting burrs 42. This member is so formed as to provide a small central opening 44 throughout its entire length and concentrically about its axis.

The tube 32 is cut and the severed portions pressed inwardly to provide a large number of tangentially arranged flanges 46 and openings 48 placing the interior of the tube 32 in communication with the space 34. The baffle 40 is spiraled so as to impart a counterclockwise rotation to the fuel mixture as it passes upwardly through the tube 32 when viewing Figure 3. Because of the arrangement of the flanges 46, the particles of raw fuel in the spirally moving mixture will be caused to shift radially and be driven through the openings 48, the flanges 46 being so tangentially arranged as to facilitate passage of the raw fuel through the openings 48. Such raw fuel will then flow downwardly in the space 34 for subsequent vaporization.

Thus the original fuel mixture is subjected to a rotating or whirling motion so that centrifugal forces are effective for throwing the heavier or wet gases against the tube 32 for separation from the lighter or dry gas which remains near the axial center of the tube. As the engine speed increases, the velocity of the intake fuel mixture is increased with corresponding increase in centrifugal forces so that a relatively dry gas or fuel mixture is attained at high engine speeds, which can not be attained in carburization alone.

The member 40 also acts as a gathering instrumentality for the raw fuel, in addition to its function as a spiraling medium for the fuel mixture.

The burrs 42 also function to collect and hold wet particles of fuel to aid in the separation of the lighter and dry gas from the heavier and wet gasoline. Thus I provide a device wherein the particles of raw gasoline are effectively extracted from the carbureted wet mixture.

Without further elaboration, the foregoing will so fully illustrate my invention, that others may, by applying current knowledge, readily adapt the same for use under various conditions of service.

I claim:

In a fuel mixer, the combination which comprises a vertically disposed cylindrical outer casing having flanged ends and provided with an annular deflecting flange around the inner surface of the lower end, an inner tubular casing having a plurality of series of spaced elongated openings through the wall thereof positioned in the cylindrical outer casing, spaced vertically disposed rods spacing the wall of the inner tubular casing from the inner surface of the said cylindrical outer casing and providing means for supporting the inner tubular casing from the said outer casing, said inner tubular casing having a flange with a centrally disposed opening therein positioned in the lower end thereof, the lower end of said inner tubular casing spaced above the lower end of the outer cylindrical casing, and a continuous spiral baffle positioned in said inner tubular casing for directing fuel and air outwardly through the said elongated opening in the wall of the inner tubular casing and into the area between the said inner tubular casing and outer cylindrical casing, the lower end of the area between the said inner tubular casing and outer cylindrical casing being substantially closed by the inner annular deflecting flange of the cylindrical casing and the upper end of said area being open, and said spiral baffle having a continuous centrally positioned longitudinally exposed opening therethrough and perforations therein with burs from the perforations extended downwardly to catch particles of raw fuel whereby said particles are held in suspension until volatilized in air passing over the surface of the baffle.

GUSTAV FRANK.

REFERENCES CITED

The following references are of record in the file of this patent:

UNITED STATES PATENTS

| Number | Name | Date |
|---|---|---|
| 1,018,851 | Thompson | Feb. 27, 1912 |
| 1,115,699 | Loose | Nov. 3, 1914 |
| 1,453,656 | Bonnell | May 1, 1923 |
| 1,473,508 | Oinan | Nov. 6, 1923 |
| 1,490,920 | Godward | Apr. 22, 1924 |
| 1,684,480 | Evans | Sept. 18, 1928 |

FOREIGN PATENTS

| Number | Country | Date |
|---|---|---|
| 256,829 | Great Britain | Aug. 19, 1926 |